United States Patent
Schoffler et al.

(10) Patent No.: US 6,345,682 B1
(45) Date of Patent: Feb. 12, 2002

(54) VALVE ARRANGEMENT FOR POWER-ASSISTED STEERING SYSTEMS

(75) Inventors: Alfred Schoffler, Schwarzackerstr.; Martin Rothmund, Steinhofgasse; Wolfram Thomas, Azaleenweg, all of (DE)

(73) Assignee: Mercedes Benz Lenkungen GmbH (DE)

( * ) Notice: Subject to any disclaimer, the term of this patent is extended or adjusted under 35 U.S.C. 154(b) by 0 days.

(21) Appl. No.: 09/600,042

(22) PCT Filed: Nov. 8, 1999

(86) PCT No.: PCT/EP99/08543

§ 371 Date: Sep. 6, 2000

§ 102(e) Date: Sep. 6, 2000

(87) PCT Pub. No.: WO00/27686

PCT Pub. Date: May 18, 2000

(30) Foreign Application Priority Data

Nov. 11, 1998 (DE) .......................... 198 52 061

(51) Int. Cl.⁷ ................................. B62D 5/06
(52) U.S. Cl. ................. 180/441; 180/415; 180/422; 180/428
(58) Field of Search ................. 180/400, 414, 180/415, 417, 421, 422, 423, 429, 428, 441, 442

(56) References Cited

U.S. PATENT DOCUMENTS

| 4,457,390 A | * | 7/1984 | Abe et al. |
| 4,940,105 A | * | 7/1990 | Matsunaga et al. |
| 5,322,142 A | * | 6/1994 | Elser |
| 5,868,216 A | * | 2/1999 | Eberhert ............... 180/428 |

FOREIGN PATENT DOCUMENTS

| DE | 41 27 610 a1 | 2/1992 |
| DE | 196 26 540 C1 | 11/1997 |
| DE | 197 54 278 A1 | 6/1998 |
| DE | 19717796 A1 | * 10/1998 |
| EP | 0 737 610 A2 | 10/1996 |

OTHER PUBLICATIONS

"Fahrwerktechnik" copy of pp. 130–135.

* cited by examiner

Primary Examiner—J. J. Swann
Assistant Examiner—F. Zeender
(74) Attorney, Agent, or Firm—Woodbridge & Associates, P.C.; Richard C. Woodbridge

(57) ABSTRACT

The invention relates to a hydraulically assisted steering system for a motor vehicle. Because there is associated with the hydraulic system an electromechanical valve 12 which, in the open state, hydraulically indirectly or directly connects the working chambers 3, 4, it is possible to dispense with conventional mechanical pressure limiting valves, secondary suction valves and limit stop valves.

8 Claims, 2 Drawing Sheets

VALVE ARRANGEMENT FOR POWER-ASSISTED STEERING SYSTEMS

The present invention relates to a hydraulically assisted steering system for a motor vehicle.

DESCRIPTION OF RELATED ART

Such steering systems are known from practical use. They are described, for example, in the reference book "Chassis Engineering: Steering Systems and Power-Assisted Steering Systems", Vogel Buch-Verlag, Wurzburg (1992). On page 130 a recirculating ball steering system with an external vane-cell pump, a steering valve and a steering gear case is illustrated, wherein the steering gear case contains a working piston which acts upon the steering shaft. A conventional power steering system of said design comprises, in addition to the rotary slide valve or rotary piston valve, one or two valves for limiting the lock of the steering shaft as well as a pressure limiting valve and a secondary suction valve, wherein the pressure limiting valve limits the pressure in the flow line of the power steering system in an upward direction and the secondary suction valve, in the event of failure of the servo assistance, enables manual displacement of the hydraulic fluid from one working chamber through a bypass into the second working chamber. The limiting valves for the angle of the steering shaft are disposed in the steering gear case or in the working piston itself and operated directly by cams associated with the steering shaft or by striking against the housing base. Upon attainment of a specific steering angle, said stop valves or limiting valves establish a hydraulic connection between the two working chambers of the working piston. The servo assistance is therefore reduced and the steering angle is in said manner effectively limited.

The described steering system therefore requires the installation of altogether up to four purely mechanical hydraulic valves, which have to be designed in accordance with the special requirements and fitted into the steering system. In practice this entails relatively high costs because each individual valve has to be separately manufactured, tested and fitted in a fluid-tight manner into the steering system.

The object of the present invention is therefore to guarantee the described functions with a simpler valve arrangement. A further object of the present invention is to provide a valve arrangement which enables different modes of operation in dependence upon the driving conditions of the motor vehicle.

Said object is achieved in the case of recirculating ball steering by a steering system having the features of claim 1 and in the case of rack-and-pinion steering by a steering system having the features of claim 2.

Because there is associated with the hydraulic system an electromechanical valve which in the open state hydraulically connects the working chambers, the mode of operation of the power steering may be influenced in dependence upon the measurement results of electrical sensors or upon other control commands. In particular it is possible to use a sensor, which monitors the wheel angle of the steered wheels or alternatively the steering wheel position, in order from a selectable wheel lock angle on to reduce or interrupt the servo assistance through connection of the two working chambers, with the result that the function of the steering angle limiting valve is taken over.

In said case, it is advantageous when an electronic circuit is provided for triggering the valve and for controlling the pressure difference in the working chambers. By said means the opening and closing of the valve may be handled flexibly and optionally even the extent of the servo assistance may be adjusted. It is further advantageous when at least one sensor for the position of the steering is provided, wherein the circuit is arranged so as to trigger the valve in dependence upon the sensor. It is thereby possible first to simulate the already mentioned steering stop through reduction of the servo assistance. It is however also possible through purposeful influencing of the servo assistance in dependence upon the steering angle to achieve a specific characteristic curve of the servo assistance. When the valve is opened given positions of the steering system which correspond to a maximum desired wheel angle, turning of the steering beyond said maximum wheel angle and consequent damage to the vehicle is reliably avoided.

When a sensor for the speed of the motor vehicle is associated with the circuit and the maximum desired wheel angel is variable in dependence upon the speed, at higher speeds it is possible to avoid a steering stop which would lead to unsafe driving conditions. At low speeds, e.g., when maneuvering, on the other hand, a wheel angle of a magnitude not desirable under normal conditions may be permitted.

A particularly compact design is achieved when the valve is disposed inside the steering gear case. The valve may, on the other hand, be mounted at a particularly accessible point without modifications to existing steering gear cases when it is disposed outside of the case, particularly in the region of a hydraulic line. Here, for example, it may be provided that the flow line of the hydraulic pump and the storage container are connected to one another, with the result that the two working chambers of the power steering system are indirectly hydraulically coupled. The ensuing effect is substantially the same.

It is further advantageous when a pressure sensor is associated with the circuit and the valve is opened upon attainment of a specific pressure or of a specific pressure difference. In said manner it is possible to dispense with the mechanical pressure limiting valve. The valve may also provide an autonomous mechanical pressure limitation in that it opens without triggering by the circuit given a specific pressurization. Especially given cold hydraulic fluid, this may prevent an excess pressure in the hydraulic system without the electronic circuit having to operate for said purpose. When the valve is opened in the event of a pressure drop in the hydraulic system, then, given discontinuation of the servo assistance already, the purely mechanical operation of the power steering by manual force is not impaired because a bypass is created from one working chamber to the other working chamber. The same applies to the situation where the valve is open in the de-energized state. With said embodiment, it is possible to dispense with the secondary suction valve which is otherwise provided for said situation.

Finally, it is advantageous when the valve in the open state presents a throttle cross section which, given pressurization by the hydraulic system, ensures a minimum pressure difference between the working chambers. The effect achieved thereby is that in the event of failure of the pressure limiting valve, e.g. as a result of parting of a cable, while travelling the steerability of the vehicle with a minimum of servo assistance is guaranteed.

There now follows a description of the present invention with reference to two embodiments for recirculating ball steering systems. The same applies to rack-and-pinion steering systems, to which the embodiments are transferable without any difficulty.

DETAILED DESCRIPTION OF THE PREFERRED EMBODIMENT

Figure 1:
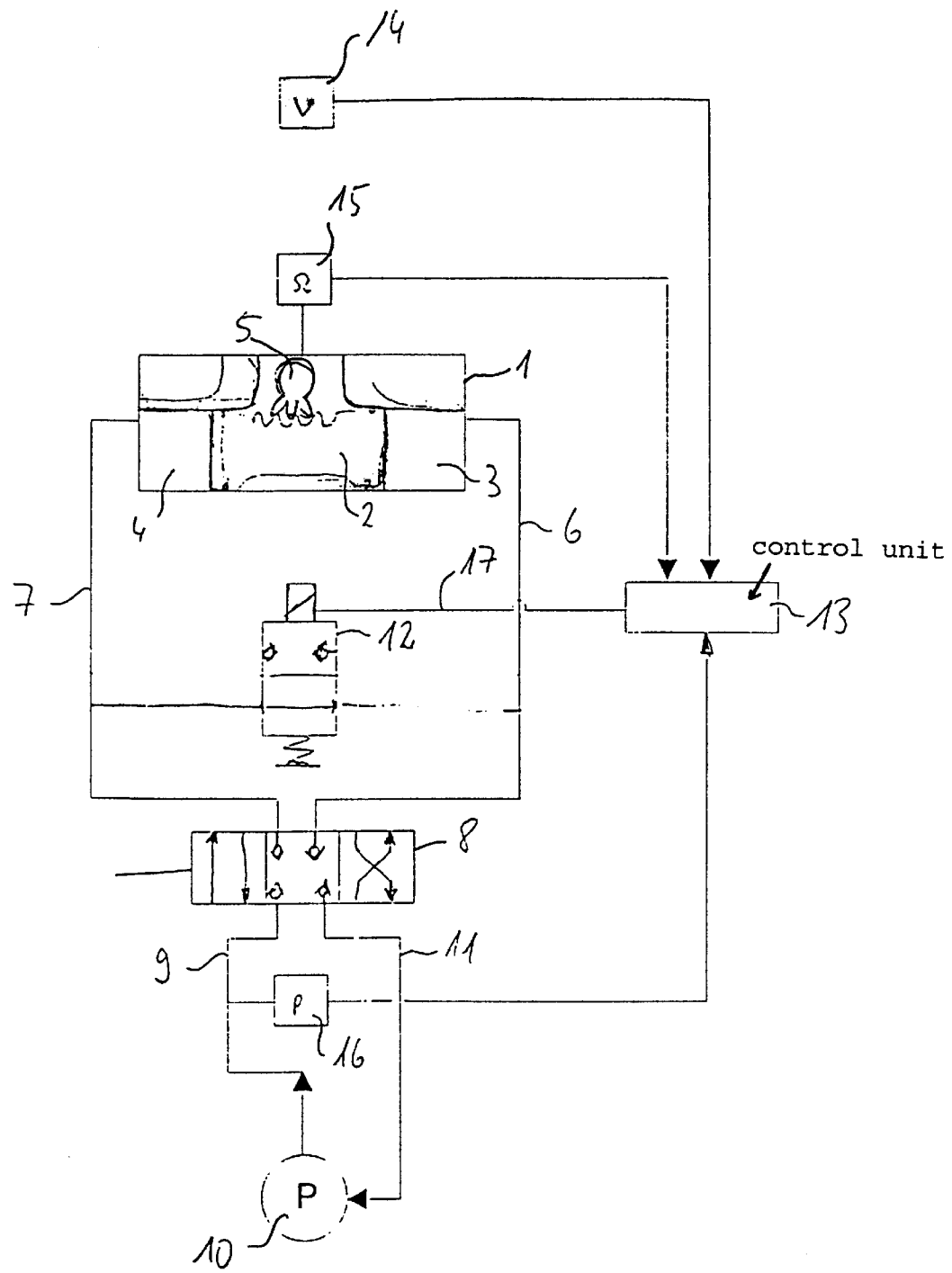
FIG. 1: a block diagram of a hydraulic power steering system in the form of recirculating ball steering with the new valve arrangement for connection of the working chambers.

FIG. 1 discloses a hydraulic steering system according to the invention in the form of recirculating ball steering with a steering gear case 1, in which a working piston 2 with two working chambers 3 and 4 as well as a steering shaft 5 are disposed. The working chambers 3 and 4 are connected by hydraulic lines 6 and 7 respectively to a servo-valve 8. The servo-valve 8 is in turn connected by a hydraulic line 9 to the upstream, pressurised line of a hydraulic pump 10 and by a hydraulic line 11 to a storage container or oil tank 18. The working chambers 3 and 4 are connected to one another by a two-way solenoid valve 12, which is open in the idle state. The two-way solenoid valve is electrically triggered by a control unit 13. Electrical measurement values of a speed sensor 14 for the vehicle speed, of an angle-of-rotation sensor 15 for the actual angular position of the steering shaft 5 or of the steering wheel, as well as of a pressure sensor 16 for the pressure prevailing in the flow line 9 are supplied to the control unit 13.

Figure 2:
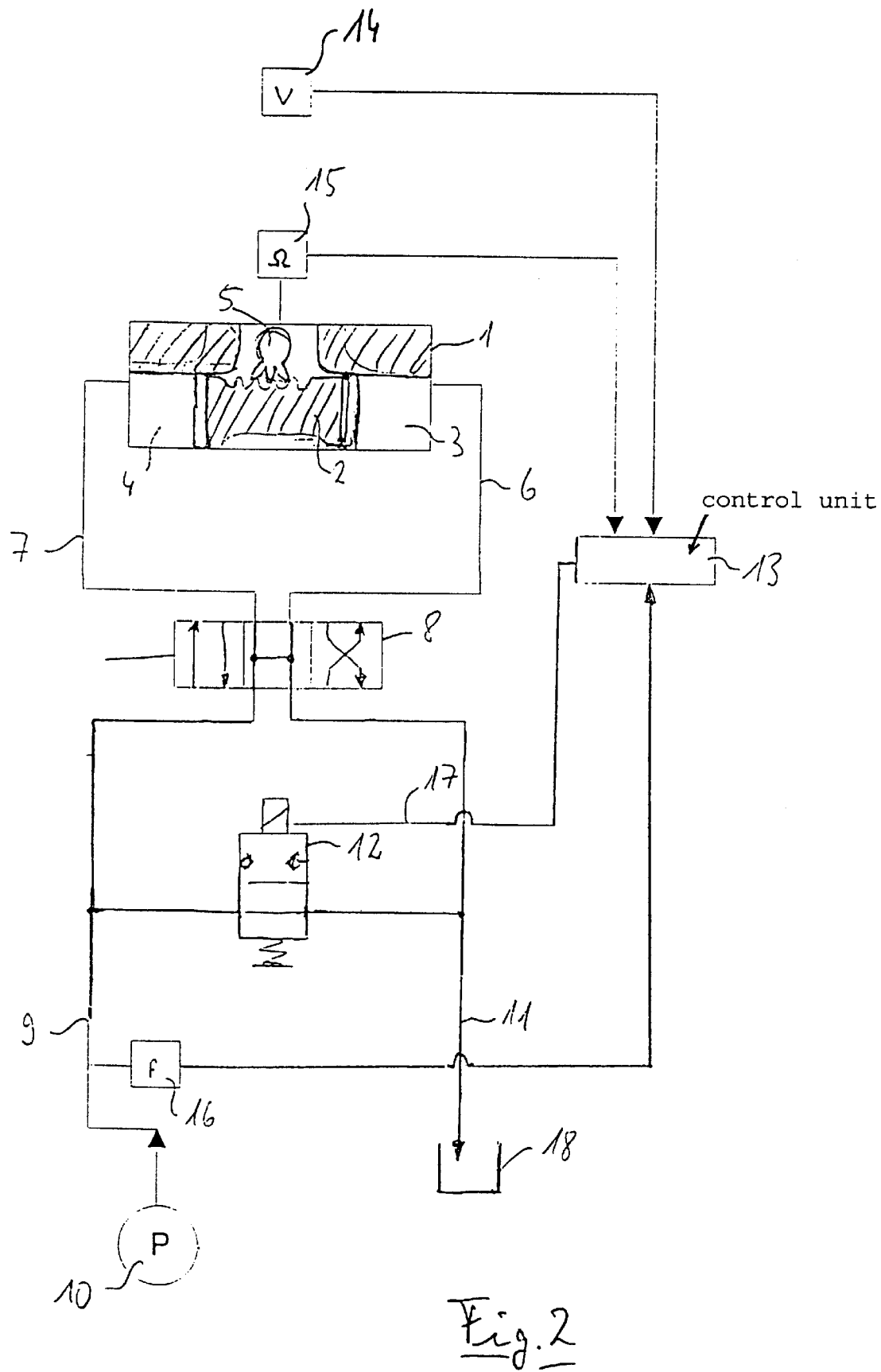
FIG. 2: a diagram as in FIG. 1 with a connection of the pump flow line and the storage container.

FIG. 2 shows a block diagram as in FIG. 1 with a connection of the pump flow line and of the storage container. Identical components are provided with identical reference numerals.

During operation, the steering system described thus far operates as follows. When the hydraulic pump 10 is running, an oil flow is first built up in the steering circuit. The resultant pressure is measured by the pressure sensor 16 and communicated to the control unit 13. During operation, the control unit 13 via a control line 17 supplies a trigger pulse to the solenoid valve 12, which then closes the connection between the hydraulic lines 6 and 7. When the servo-valve 8 is then triggered via the steering of the motor vehicle, the flow line 9 is connected to one of the working chambers 3 or 4 so that the piston 2 disposed movably in the steering gear case 1 moves in the direction pointing in each case away from the working chamber 3 or 4. Via the tooth system of the working piston the steering shaft 5 is then rotated accordingly and the steering of the motor vehicle is operated. The angle-of-rotation sensor 15 communicates the actual position of the steering shaft 5 or of the steering wheel to the control unit 13. The speed sensor 14 communicates the driving speed of the motor vehicle likewise as an electrical signal to the control unit 13.

The control unit 13 influences the operation of the steering in dependence upon the signals of the sensors 14, 15 and 16. When the maximum permissible steering angle is detected by the angle-of-rotation sensor 15 of the steering shaft 5, the control unit 13 opens the two-way solenoid valve 12, thereby leading to a direct hydraulic connection between the lines 6 and 7 and hence to a pressure equalization in the working chambers 3 and 4. The servo assistance of the steering is therefore reduced and the increasing expenditure of force perceptible at the steering wheel of the motor vehicle simulates a mechanical stop of the steering. A further steering lock in the direction of turning therefore generally does not occur. Damage to the motor vehicle or other undesirable consequences of too great a wheel lock angle are therefore reliably avoided. The opening point of the solenoid valve 12 upon attainment of specific wheel lock angles may be varied in dependence upon the speed sensor 14. Thus, for example, given a specific driving speed the maximum steering angle may be limited in that the solenoid valve 12 already opens at a lower wheel angle than in the stationary state. In said manner the steering angles during travel may be limited to a range which guarantees safer driving conditions.

Finally, the control unit 13 determines the pressure in the flow line 9 by means of the sensor 16 and may open the solenoid valve 12 in the event of a complete pressure drop. The effect of said operating possibility is that, given discontinuation of the servo assistance anyway, manual operation of the steering is not additionally hindered by a high flow resistance of the hydraulic fluid from one working chamber 3, 4 into the other working chamber 4, 3. Should the pressure in the flow line 9 be too high, the control unit 13 may likewise open the solenoid valve 12 to enable a pressure reduction and hence avoid damage to the pump or the hydraulic system. Finally, the control unit 13 may also trigger the two-way solenoid valve in a pulsed or clocked manner in order to realize a pressure limitation or pressure reduction in the flow line of the power steering.

The embodiment according to FIG. 1 has the advantage that, in the event of excess pressure limitation becoming operative, the hydraulic fluid is pumped through a relatively long circuit and so a relatively large quantity is circulated. This prevents overheating and damage of the fluid. An (incorrectly) fully closed servo-valve however leads to a pressure rise in the pump flow line 9 which may not be prevented by opening of the valve 8.

In the embodiment according to FIG. 2, it is advantageous that the excess pressure function of the valve 12 for protection of the hydraulic system is guaranteed even when the servo-valve 8 is blocked.

The two-way solenoid valve 12 in conjunction with the control unit 13 therefore enables the functions of conventional limiting valves for the maximum steering angle, pressure limiting valves and secondary suction valves. The arrangement described thus far may, in terms of the outlay for materials and assembly, be considered more advantageous than conventional steering systems, which use a total of up to four purely mechanical valves corresponding to up to three different designs. In vehicles carrying extensive electronic equipment, moreover, the sensors 14 and 15 as well as the control unit 13 and optionally the sensor 16 are provided as it is, with the result that the appropriate functions merely have to be implemented.

In contrast to the conventional steering systems with purely mechanical valves, control of the power steering in dependence upon a characteristic map may be effected by means of the two-way solenoid valve 12, which takes into account the driving conditions detected at any one time.

What is claimed is:

1. A hydraulically assisted steering system for a motor vehicle, comprising:
    a hydraulic system;
    a steering gear case, including a displaceably mounted gear rack and a working piston which delimits two hydraulically pressuriziable working chambers (3, 4) which when pressurized move the working piston and the gear rack linearly;
    an electromechanical valve (12), which in the open state hydraulically indirectly or directly connects said working chambers (3, 4), and
    wherein for positions of said steering system which correspond to a maximum desired wheel angle, said electromechanical valve (12) is opened.

2. A hydraulically assisted steering system for a motor vehicle, comprising:
   a hydraulic system;
   a steering gear case, including a displaceably mounted gear rack and a working piston which delimits two hydraulically pressuriziable working chambers (3, 4) which when pressurized move the working piston and the gear rack linearly;
   an electromechanical valve (12), which in the open state hydraulically indirectly or directly connects said working chambers (3, 4);
   an electronic circuit (13) for triggering said valve (12) for controlling the pressure difference in said working chambers (3, 4); and
   wherein a sensor (14) for the speed of the motor vehicle is associated with said circuit (13) and wherein the maximum desired wheel angle is variable in dependence upon the speed.

3. A hydraulically assisted steering system for a motor vehicle, comprising:
   a hydraulic system;
   a steering gear case, including a displaceably mounted gear rack and a working piston which delimits two hydraulically pressuriziable working chambers (3, 4) which when pressurized move the working piston and the gear rack linearly;
   an electromechanical valve (12), which in the open state hydraulically indirectly or directly connects said working chambers (3, 4);
   an electronic circuit (13) for triggering said valve (12) for controlling the pressure difference in said working chambers (3, 4); and wherein said valve (12) opens without triggering by the circuit (13) given a specific pressurization.

4. A hydraulically assisted steering system for a motor vehicle, comprising:
   a hydraulic system;
   a steering gear case, including a displaceably mounted gear rack and a working piston which delimits two hydraulically pressuriziable working chambers (3, 4) which when pressurized move the working piston and the gear rack linearly;
   an electromechanical valve (12), which in the open state hydraulically indirectly or directly connects said working chambers (3, 4), and
   wherein said valve (12) is opened in the event of a complete pressure drop in said hydraulic system.

5. A hydraulically assisted steering system for a motor vehicle, comprising:
   a hydraulic system;
   a steering gear case (1), including a rotatably mounted steering shaft (5), a gear segment non-rotatably connected to said steering shaft;
   a working piston (2) which delimits two hydraulically pressuriziable working chambers (3, 4) and is in mesh with gear teeth of a said steering shaft (5), whereupon pressurization of said working chambers moves the working piston (2) linearly and the steering shaft (5) rotationally;
   an electro-mechanical valve (12), which in the open state hydraulically indirectly or directly connects the working chambers (3, 4),
   wherein for positions of the steering system which correspond to a maximum desired wheel angle, said valve (12) is opened.

6. A hydraulically assisted steering system for a motor vehicle, comprising:
   a hydraulic system;
   a steering gear case (1), including a rotatably mounted steering shaft (5), a gear segment non-rotatably connected to said steering shaft;
   a working piston (2) which delimits two hydraulically pressuriziable working chambers (3, 4) and is in mesh with gear teeth of a said steering shaft, (5) whereupon pressurization of said working chambers moves the working piston (2) linearly and the steering shaft (5) rotationally;
   an electro-mechanical valve (12), which in the open state hydraulically indirectly or directly connects the working chambers (3, 4),
   an electronic circuit for triggering the valve (12) for controlling the pressure difference in the working chambers (3, 4), and
   wherein a sensor (14) for the speed of the motor vehicle is associated with the circuit (13) and wherein the maximum desired wheel angle is variable in dependence upon the speed.

7. A hydraulically assisted steering system for a motor vehicle, comprising:
   a hydraulic system;
   a steering gear case (1), including a rotatably mounted steering shaft (5), a gear segment non-rotatably connected to said steering shaft;
   a working piston (2) which delimits two hydraulically pressurizable working chambers (3, 4) and is in mesh with gear teeth of a said steering shaft (5) whereupon pressurization of said working chambers moves the working piston (2) linearly and the steering shaft (5) rotationally;
   an electro-mechanical valve (12), which in the open state hydraulically indirectly or directly connects the working chambers (3, 4);
   an electronic circuit for triggering the valve (12) for controlling the pressure difference in the working chambers (3, 4), and
   wherein said valve (12) opens without triggering by the circuit (13) given a specific pressurization.

8. A hydraulically assisted steering system for a motor vehicle, comprising:
   a hydraulic system;
   a steering gear case (1), including a rotatably mounted steering shaft (5), a gear segment non-rotatably connected to said steering shaft;
   a working piston (2) which delimits two hydraulically pressurizable working chambers (3, 4) and is in mesh with gear teeth of a said steering shaft (5) whereupon pressurization of said working chambers moves the working piston (2) linearly and the steering shaft (5) rotationally;
   an electro-mechanical valve (12), which in the open state hydraulically indirectly or directly connects the working chambers (3, 4), and
   wherein said valve (12) is opened in the event of a complete pressure drop in the hydraulic system.

* * * * *